(12) United States Patent
Chang

(10) Patent No.: US 12,293,175 B2
(45) Date of Patent: May 6, 2025

(54) METHOD OF UPDATING BMC FIRMWARE OF A SERVER

(71) Applicant: Mitac Computing Technology Corporation, Taoyuan (TW)

(72) Inventor: Chih-Peng Chang, Taoyuan (TW)

(73) Assignee: Mitac Computing Technology Corporation, Taoyuan (TW)

( * ) Notice: Subject to any disclaimer, the term of this patent is extended or adjusted under 35 U.S.C. 154(b) by 521 days.

(21) Appl. No.: 17/453,464

(22) Filed: Nov. 3, 2021

(65) Prior Publication Data

US 2022/0147340 A1 May 12, 2022

(30) Foreign Application Priority Data

Nov. 9, 2020 (TW) ................................ 109138970

(51) Int. Cl.
*G06F 8/65* (2018.01)
*G06F 9/445* (2018.01)
*G06F 13/42* (2006.01)

(52) U.S. Cl.
CPC ............ *G06F 8/65* (2013.01); *G06F 9/44505* (2013.01); *G06F 13/4282* (2013.01); *G06F 2213/0016* (2013.01)

(58) Field of Classification Search
CPC .... G06F 8/65; G06F 9/44505; G06F 13/4282; G06F 2213/0016
See application file for complete search history.

(56) References Cited

U.S. PATENT DOCUMENTS

| | | | |
|---|---|---|---|
| 10,642,623 B1* | 5/2020 | Righi | ........................ G06F 8/65 |
| 2007/0169088 A1* | 7/2007 | Lambert | ............. G06F 11/0709 |
| | | | 717/168 |
| 2013/0007430 A1* | 1/2013 | Fan | ........................ G06F 8/654 |
| | | | 713/1 |
| 2014/0317612 A1* | 10/2014 | Ayanam | .................... G06F 8/65 |
| | | | 717/171 |
| 2017/0046151 A1* | 2/2017 | Hsu | .......................... G06F 8/654 |
| 2017/0090896 A1* | 3/2017 | Lin | ............................ G06F 8/61 |
| 2017/0131991 A1* | 5/2017 | Su | ............................. G06F 8/66 |
| 2017/0344360 A1* | 11/2017 | Jayapaul | ............... G06F 9/4406 |

* cited by examiner

*Primary Examiner* — S. Sough
*Assistant Examiner* — Cheneca Smith
(74) *Attorney, Agent, or Firm* — MLO, a professional corp.

(57) ABSTRACT

A method of updating firmware of a BMC of a server, the server includes the BMC and a PLD, the method includes: in response to receipt of a firmware update instruction to update the firmware of the BMC, the BMC storing in the PLD a firmware configuration file that contains current settings; the BMC updating the firmware after storing the firmware configuration file in the PLD; the BMC being reset after updating the firmware; and the BMC executing an initializing process that includes sub-steps of reading the firmware configuration file from the PLD and applying the current settings contained in the firmware configuration file to the firmware.

14 Claims, 2 Drawing Sheets

METHOD OF UPDATING BMC FIRMWARE OF A SERVER

CROSS-REFERENCE TO RELATED APPLICATION

This application claims priority to Taiwanese Invention Patent Application No. 109138970, filed on Nov. 9, 2020.

FIELD

The disclosure relates to a method of updating firmware of a BMC of a server.

BACKGROUND

A baseboard management controller (BMC) is a specialized microcontroller embedded on a motherboard of a server, allowing remote management of the server. The BMC stores a firmware configuration file containing various configuration settings, such as network environment options, HTTP port values, a power consumption threshold, and user accounts, etc., and the BMC operates based on the firmware configuration file stored therein.

When an administrator of the server intends to update firmware of the BMC and selects an option of preserving the configuration settings during the update, the BMC would transmit the firmware configuration file to a remote storage before the firmware update. After the firmware of the BMC has been updated, the BMC would be reset and initialized (with default settings). Then, upon operation by the administrator in relation to retrieving the firmware configuration file from the remote storage, the BMC would then be reset and initialized again, this time according to the configuration settings thus retrieved.

In this way, although the configuration settings can be preserved, the whole procedure of firmware update takes a long time. Further, since retrieving the firmware configuration file from the remote storage is operated by the administrator, the configuration files stored in the remote storage should be managed and organized systematically, and the BMC and the server would not function properly if the administrator makes a mistake in the retrieval of the firmware configuration file (e.g., retrieving a wrong configuration file) from the remote storage.

SUMMARY

Therefore, an object of the disclosure is to provide a method for updating firmware of a BMC of a server and capable of alleviating at least one of the drawbacks of the prior art.

According to the disclosure, the server includes the BMC and a programmable logic device (PLD) connected to the BMC, and the method includes the following steps:
   in response to receipt of a firmware update instruction to update the firmware of the BMC, the BMC storing in the PLD a firmware configuration file that contains current settings;
   the BMC updating the firmware after storing the firmware configuration file in the PLD;
   the BMC being reset after updating the firmware; and
   the BMC executing an initializing process that includes sub-steps of reading the firmware configuration file from the PLD and applying the current settings contained in the firmware configuration file to the firmware.

Another object of the disclosure is to provide a server that can alleviate at least one of the drawbacks of the prior art.

According to one embodiment of the disclosure, the server includes a BMC and a PLD.

The BMC is configured to
   store in the PLD a firmware configuration file that contains current settings in response to receipt of a firmware update instruction to update the firmware of the BMC,
   load a new version of the firmware and overwrite a current version of the firmware with the new version after storing the firmware configuration file in the PLD, so as to update the firmware,
   be reset after updating the firmware, and
   execute an initializing process that includes reading the firmware configuration file from the PLD and applying the current settings contained in the firmware configuration file to the firmware.

BRIEF DESCRIPTION OF THE DRAWINGS

Other features and advantages of the disclosure will become apparent the following detailed description of the embodiment(s) with reference to the accompanying drawings, of which.

DETAILED DESCRIPTION

Throughout the disclosure, the terms "connected to" and "electrically connected to" may refer to a physical connection between two or more electronic devices or components via an electrically conductive material (which may be referred to as a direct electrical connection), or via other electronic devices or components (which may be referred to as an indirect electrical connection).

Figure 1:
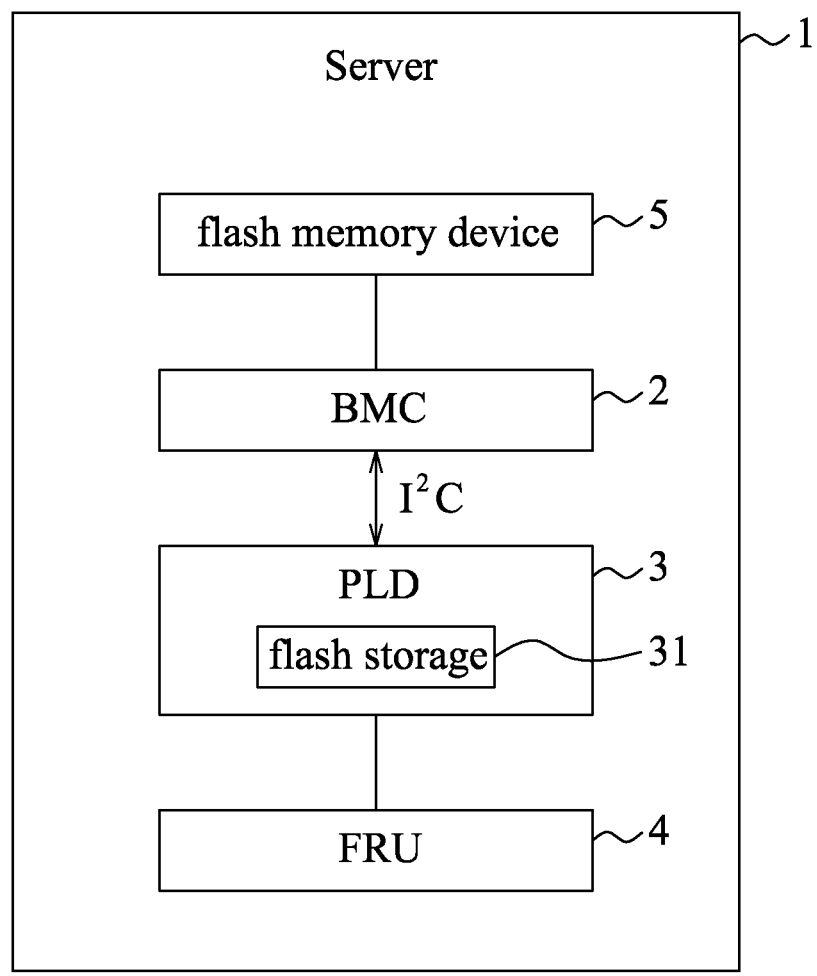
FIG. 1 is a block diagram of a server according to an embodiment of the disclosure.
Figure 2:
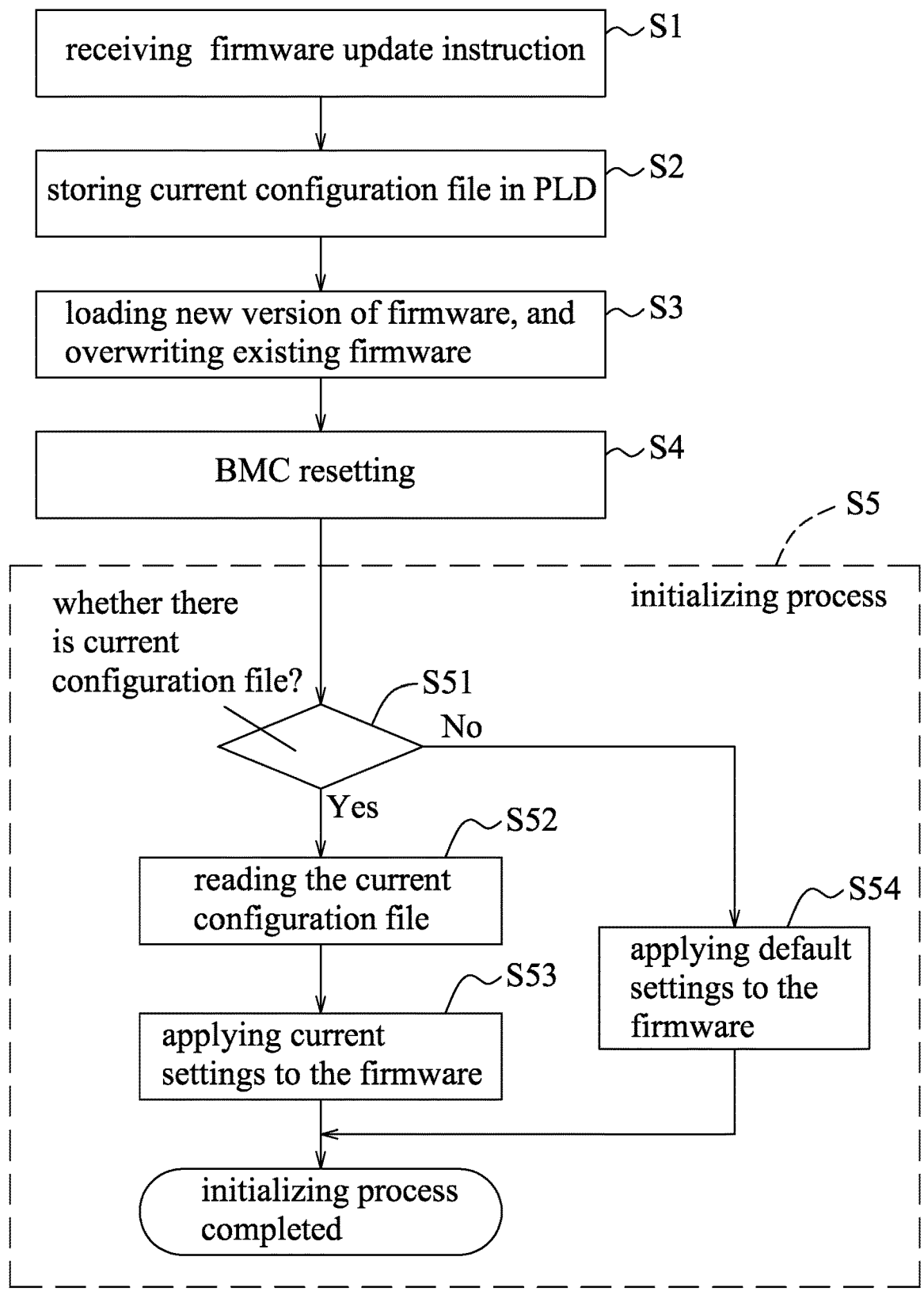
FIG. 2 is a flow chart illustrating a method of updating firmware of a BMC of a server according to an embodiment of the disclosure.

Referring to FIGS. 1 and 2, a method of updating firmware of a baseboard management controller (BMC) 2 of a server 1 is provided according to an embodiment of this disclosure. The server 1 includes the BMC 2, a programmable logic device (PLD) 3 connected to the BMC 2, a field replace unit (FRU) 4 connected to the PLD 3, and a flash memory device 5 connected to the BMC 2. In this embodiment, the PLD 3 is a Complex PLD (CPLD) having built-in flash storage 31. In other embodiments, a Field-Programmable Gate Array (FPGA) or other similar devices may be used instead of the CPLD.

Further, the BMC 2 communicates with the PLD 3 via an inter-integrated circuit ($I^2C$) bus with specific commands in compliance with specifications of the Intelligent Platform Management Interface (IPMI). In this embodiment, the specific commands are specific IPMI commands that are defined and specified using IPMItool. The BMC 2 may, according to the specific commands, transmit a current configuration file via the $I^2C$ bus to the PLD 3, so that the PLD 3 may store the current configuration file into the flash storage 31 (elaborated below). The current configuration file may be read out from the flash storage 31 of the PLD 3 according to the specific commands as well (elaborated below).

The method of updating firmware of the BMC 2 includes steps S1 to S5 described in the following.

In step S1, the BMC 2 receives from a remote administrator a firmware update instruction to update the firmware of the BMC 2.

In step S2, in response to receipt of the firmware update instruction, the BMC 2 stores in the PLD 3 a firmware configuration file with a specific filename, such as "BMC-Conf00". The firmware configuration file contains current configuration settings, such as current network environment options, HTTP port values that are currently applied, a power consumption threshold that is currently applied, and user accounts that have been recorded, etc. For the sake of simplicity, the firmware configuration file containing the current configuration settings is hereinafter shortened to "the current configuration file."

It is noted that, in this embodiment, each version of the firmware of the BMC 2 has a factory default setting that enables a communication function allowing the BMC 2 to communicate with the PLD 3. The BMC 2, before or after firmware update, communicates with the PLD 3 by means of the specific IPMI commands under the communication function, allowing the BMC 2 to store the current configuration file in the PLD 3.

Further, in this embodiment, step S2 is implemented by executing specific IPMI commands for writing data, such as Single Write, Start of Multi-Write, Middle of Multi-Write, End of Multi-Write, etc. These specific IPMI commands are pre-defined and have a preset format that includes, for example but not limited to, a one-byte code indicating a command ID, a two-byte code indicating a file length, a nine-byte code indicating a filename, and a nine-byte code indicating file content, so as to make the BMC 2 write files accordingly. In this embodiment, when the BMC 2 intends to store the current configuration file in the PLD 3, the nine-byte code indicating a filename in the command should be "0x42 0x4d 0x43 0x43 0x6f 0x6e 0x66 0x30 0x30" to indicate the specific filename "BMCConf00."

In step S3, the BMC 2 loads a new version of the firmware (that may be pre-stored stored in the flash memory device 5), and overwrites a current version of the firmware with the new version, so as to update the firmware.

In step S4, the BMC 2 is reset automatically after the firmware of the BMC 2 has been updated.

In step S5, the BMC 2 executes an initializing process. The initializing process includes the following sub-steps.

In sub-step S51, the BMC 2 determines whether there is a current configuration file stored in the PLD 3. In this embodiment, sub-step S51 is implemented by executing a specific IPMI command "Read File Request." The IPMI command "Read File Request" is used to check whether there is a configuration file stored in the flash storage 31 of the PLD 3 by checking the filename of each file stored in the PLD 3. The IPMI command "Read File Request" may be pre-defined with a preset format that includes, for example but not limited to, a one-byte code indicating a command ID, and a nine-byte code indicating a filename. When a file stored in the flash storage 31 has a filename that is identical to the spec is filename (e.g., "BMCConf00"), the BMC 2 determines that there is a current configuration file stored therein and executes sub-step S52. Otherwise, when the BMC 2 determines that there is no current configuration file stored in the flash storage 31, the flow goes to sub-step S54.

In sub-step S52, when it is determined that there is a current configuration file stored in the flash storage 31 of the PLD 3, the BMC 2 reads the current configuration file from the PLD 3.

Specifically, sub-step S52 is implemented by executing specific IPMI commands that are pre-defined for reading data, such as Start of Multi-Read, Middle of Multi-Read, End of Multi-Read, etc. These specific IPMI commands are pre-defined with a preset format that includes, for example but not limited to, a one-byte code indicating a response ID, a one complete code, and a twelve-byte code indicating a file size, so as to make the BMC 2 read files accordingly. For example, if there is a file having the specific filename, the one-byte complete code is "0xCC"; otherwise, the one-byte complete code is a code other than "0xCC".

In sub-step S53, the BMC 2 applies the current configuration settings contained in the current configuration file to the firmware, so as to complete the initializing process.

In this way, the updated firmware can still utilize the same configuration settings as did the firmware before the update without having to store the firmware configuration file beforehand in a storage device external to the server 1 (e.g., a remote storage). As a result, the initializing process of the BMC 2 using the then-current configuration settings of the firmware before the update can be executed efficiently and correctly without manual operation for retrieving the firmware configuration file from the external storage device.

It is noted that, to ensure that applicable configuration settings for the updated firmware are always available in any case (for example, in a case that the communication function for allowing communication between the BMC 2 and the PLD 3 is disabled), the BMC 2, when it is determined that there is no current configuration file stored in the PLD 3 in sub-step S51, executes sub-step S54 to utilize default settings of the new version of the firmware and apply the default settings to the firmware.

Furthermore, in some embodiments, besides storing the current configuration file in the flash storage 31 of the PIP 3, the BMC 2 further stores the same in the flash memory device 5 as a backup in step S2, so that the BMC 2 can still retrieve the current configuration settings from the flash memory device 5 even if the communication function for allowing communication between the BMC 2 and the PLD 3 is disabled or the current configuration file cannot be stored properly in the PLD 3. In addition, the BMC 2 further stores the current configuration file in the FRU 4 as a backup.

To sum up, the communication function allowing communication between the BMC 2 and the PLD 3 is enabled before updating the firmware, so the current configuration file can be stored in the PLD 3 (step S2) and then read from the PLD 3 during the initializing process (step S5). Since the current configuration file can be read at the beginning of the initializing process, there is no need for the BMC 2 to be initialized with the default settings first, to be reset, and then to be initialized again after retrieving the current configuration file. In addition, there is no need to store and retrieve the current configuration file in and from an external storage device, and consequently the need to manage and organize multiple configuration for individual BMCs in the external storage device is dispensed with. That is to say, the BMC 2 only needs to be reset and to execute the initializing process once during the update of the firmware, and therefore, the duration of the update may be shortened significantly. Further, the current configuration file may be read automatically without manual operation of an administrator, and thus human error may be avoided.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method of updating firmware of a baseboard management controller (BMC) of a server, the server including the BMC and a programmable logic device (PLD) connected to the BMC, the method comprising steps of:
   in response to receipt of a firmware update instruction to update the firmware of the BMC, the BMC storing in the PLD a firmware configuration file that contains current settings;
   after storing the firmware configuration file in the PLD, the BMC loading a new version of the firmware, and overwriting a current version of the firmware with the new version, so as to update the firmware;
   the BMC being reset after updating the firmware; and
   the BMC executing an initializing process that includes sub-steps of reading the firmware configuration file from the PLD and applying the current settings contained in the firmware configuration file to the firmware, so as to complete the initializing process without having to reset and initialize again;
   wherein the step of the BMC executing the initializing process further includes, before reading the firmware configuration file from the PLD, sub-steps of:
   determining whether there is stored in the PLD the firmware configuration file that contains the current settings;
   when it is determined that there is no firmware configuration file that contains the current settings stored in the PLD, applying default settings of the new version of the firmware to the firmware, so as to complete the initializing process without having to reset and initialize again;
   wherein the sub-steps of reading the firmware configuration file from the PLD and applying the current settings contained in the firmware configuration file to the firmware are executed only when it is determined that there is the firmware configuration file that contains the current settings stored in the PLD;
   wherein each version of the firmware of the BMC has a factory default setting that enables a communication function allowing the BMC to communicate with the PLD.

2. The method of claim 1, wherein the step of storing in the PLD the firmware configuration file that contains the current settings and the sub-step of reading the firmware configuration file from the PLD are implemented via an inter-integrated circuit (I²C) bus with specific commands in compliance with specifications of Intelligent Platform Management Interface (IPMI).

3. The method of claim 2, wherein the sub-step of determining whether there is stored in the PLD the firmware configuration file that contains the current settings is implemented by executing a specific IPMI command that is pre-defined and has a preset format for checking whether there is a configuration file stored in the PLD.

4. The method of claim 3, wherein executing the specific IPMI command for checking whether there is the configuration file stored in the PLD includes: checking a filename of each file stored in the PLD.

5. The method of claim 2, wherein the sub-step of reading the firmware configuration file from the PLD is implemented by executing a specific IPMI command for reading data.

6. The method of claim 2, wherein the step of storing in the PLD the firmware configuration file that contains the current settings is implemented by executing a specific IPMI command for writing data.

7. The method of claim 1, further comprising a step of the BMC storing the firmware configuration file that contains the current settings in a flash memory device which is connected to the BMC.

8. The method of claim 1, further comprising a step of the BMC storing the firmware configuration file that contains the current settings in a field replace unit (FRU).

9. A server, comprising:
   a baseboard management controller (BMC); and
   a programmable logic device (PLD) connected to said BMC,
   wherein said BMC is configured to:
   store in said PLD a firmware configuration file that contains current settings in response to receipt of a firmware update instruction to update a firmware of said BMC,
   load a new version of the firmware and overwrite a current version of the firmware with the new version after storing the firmware configuration file in said PLD, so as to update the firmware,
   be reset after updating the firmware, and
   execute an initializing process that includes reading the firmware configuration file from said PLD and applying the current settings contained in the firmware configuration file to the firmware, so as to complete the initializing process without having to reset and initialize again;
   wherein said PLD has a flash storage, the firmware configuration file that contains the current settings is stored in said flash storage; and
   said BMC is further configured to determine whether there is stored in said flash storage the firmware configuration file that contains the current settings before reading the firmware configuration file;
   wherein each version of the firmware of said BMC has a factory default setting that enables a communication function allowing said BMC to communicate with said PLD.

10. The server of claim 9, wherein said BMC determines whether there is stored in said flash storage the firmware configuration file that contains the current settings by executing a specific IPMI command that is pre-defined and has a preset format for checking whether there is a configuration file stored in said flash storage by checking a filename of each file stored in said flash storage.

11. The server of claim 9, wherein said PLD is connected to said BMC via an inter-integrated circuit (I²C) bus.

12. The server of claim 9, wherein said BMC communicates with said PLD with specific commands in compliance with specifications of Intelligent Platform Management Interface (IPMI).

13. The server of claim 9, further comprising a flash memory device which is connected to said BMC,
   wherein said BMC further stores the firmware configuration file that contains the current settings in said flash memory device.

14. The server of claim 9, further comprising a field replace unit (FRU) which is connected to said PLD,
   wherein said BMC further stores the firmware configuration file that contains the current settings in said field replace unit (FRU).

* * * * *